3,583,988
VAPOR PHASE PRODUCTION OF PERCHLORINATED AROMATIC HETEROCYCLIC NITROGEN COMPOUNDS
Howard Johnston and Sven H. Ruetman, Walnut Creek, Calif., assignors to The Dow Chemical Company, Midland, Mich.
No Drawing. Filed Dec. 26, 1967, Ser. No. 693,153
Int. Cl. C07d 51/76
U.S. Cl. 260—250                                    12 Claims

ABSTRACT OF THE DISCLOSURE

Saturated or partially saturated heterocyclic nitrogen compounds such as piperazine, N-methylpiperazine, N,N'-dimethylpiperazine, piperidine, 2-methylpiperidine, tetrahydroquinoline and decahydroquinoline are simultaneously chlorinated and aromaticized to produce perchlorinated aromatic heterocyclic nitrogen compounds. The process is one whereby mixed vapors of an appropriate heterocyclic nitrogen compound and chlorine are reacted together in the presence of a diluent gas at temperatures of from at least 350° C. to about 750° C.

BACKGROUND OF THE INVENTION

Heterocyclic nitrogen compounds such as 1,2,3,4-tetrahydroquinoline-N-carbonyl chloride, piperidine-N-carbonyl chloride and N,N'-dimethylpiperazine have heretofore been reacted with chlorine in either liquid or vapor phase to effect aromatization and chlorination of the starting material. The methods so taught have been complex and time consuming, with reaction periods of several hours being not uncommon. Frequently they have involved the use of two of more distinct chlorination steps, each conducted under different conditions, with the reaction being carried on in the presence of a heterogeneous or actinic catalyst. Moreover, the known methods, particularly those conducted in the vapor phase, are almost always accompanied by extensive formation of tars and of undesirable degradation products. This has been particularly true when it has been sought to obtain perchloro derivatives.

Formation of such tars and degradation products is an obvious economic waste. Moreover, the presence of such undesirable products renders purification and isolation of the desired product difficult. Not infrequently, the presence of undesirable by-products hinders the formation of the desired products in such manner as to necessitate isolation of an intermediate chlorination product which may thereafter be subjected to further chlorination. The limitations of such methods are obvious. It is clearly seen that there is a need for a method for producing perchlorination products of aromatic nitrogen heterocycles with substantially no tar formation and without significant degradation products formation.

It is an object of the present invention to provide efficient, rapid methods for the chlorination and aromatization of saturated or partially saturated cyclic nitrogen compounds to produce perchlorinated aromatic heterocyclic nitrogen compounds whereby formation of substantial quantities of degradative by-products may be avoided and whereby tar formation is substantially completely avoid. It is another object of the present invention to provide methods of the above character which may be conducted in a single stage and in the absence of a catalyst whereby highly chlorinated heterocyclic nitrogen compounds may be prepared substantially as a single or major component of a reaction product composition or may be prepared in such amounts as to make recovery of products practicable as a production method. It is a further object of the present invention to selectively produce a perchlorinated product or product composition. It is a further object of the present invention to produce perchlorinated heterocyclic nitrogen compounds in good yields and with substantially no tar formation. Other objects will become apparent from a consideration of the following description of the invention and the claims.

SUMMARY OF THE INVENTION

According to the present invention, it has been discovered that heterocyclic nitrogen compounds which are at least partially saturated may be simultaneously chlorinated and aromaticized to produce perchlorinated aromatic heterocyclic nitrogen compounds by the practice of a method whereby mixed vapors of an appropriate heterocyclic nitrogen compound and chlorine present in excess over the stoichiometrically required amount are reacted together in the presence of a diluent gas at temperatures in a range of from at least 350° C. to about 750° C. under conditions of turbulent flow. The reaction takes place very rapidly and in an efficient manner without any substantial formation of tarry by-products.

The expressions "heterocyclic nitrogen compound which is at least partially saturated" or simply "heterocyclic nitrogen compound," as employed herein, designate a heterocyclic nitrogen compound containing at least one six-member ring made up of only nitrogen and carbon as its ring forming atoms, and which is at least partially saturated, i.e., free or at least partially free of the fully conjugated double bond structure which characterizes six-member ring aromatic compounds. Piperidine and decahydroquinoline are representative of saturated heterocyclic nitrogen compounds, while 1,2,3,4-tetrahydroquinoline is representative of a partially saturated heterocyclic nitrogen compound. Further, said expression is also inclusive of ring compounds of the above character which bear one or a plurality of neutral substituents other than hydrogen on the ring atoms. Thus, the nitrogen atoms may bear lower hydrocarbyl groups, e.g., methyl or ethyl, which readily split off as the chlorination-aromatization reaction proceeds. Similarly, groups such as methyl or cyano can be attached to one or more of the ring carbon atoms (preferably not more than two such groups are present) and under the more stringent of the reaction conditions descibed herein chloronolysis of these groups also takes place. One or more chloro groups may also be present on the ring as neutral substituents. Representative heterocyclic nitrogen compounds which may be perchlorinated by the process of this invention include: piperidine, N-methylpiperidine, N-ethylpiperidine, 2-methylpiperidine, decahydroquinoline, 1,2,3,4-tetrahydroqunoline, 1,2,3,4-tetrahydroisoquinoline, N-methylpiperazine, N,N'-dimtehylpiperazine, piperazine, tetrahydropyrimidine, 1,2,3,4-tetrahydroquinoxaline, decahydroquinoxaline, 1,2,3,4-tetrahydroquinazoline, and decahydroquinazoline.

To provide the diluent gas which is present during the reaction there may be employed materials which can be readily vaporized and which are substantially inert to the action of chlorine under the reaction conditions empolyed. Included are nitrogen, carbon dioxide and perchlorinated hydrocarbons, for example. Chlorohydrocarbons such as chloroform can also be employed provided sufficient excess chlorine is supplied to convert the diluent to a perchlorohydrocarbon in the reaction zone. The preferred diluents are volatile perchlorinated hydrocarbons such as tetrachloroethylene, hexachlorobutadiene and carbon tetrachloride. It is also possible to practice the invention by employing as the diluent gas a large excess of the chlorine reactant over and above the stoichiometric chlorine requirement.

In practicing the present invention, an excess of chlorine is employed. The term "excess chlorine," is employed herein, designates chlorine employed in an amount over and above that which is stoichiometrically required to effect aromatization and perchlorination of the heterocyclic nitrogen starting material to form the aromatic heterocyclic nitrogen product and hydrogen chloride and other by-products, as well as any required to convert the diluent to a perchlorinated hydrocarbon, as referred to above. The stoichiometric requirements for chlorine are ½ mole for each hydrogen atom carried on the ring of the starting compound and ½ mole for each chlorine atom to be attached to the ring to form the perchlorinated product. The removal of any side groups such as methyl or cyano, for example, will require additional chlorine. Thus, removal of a methyl group may require as much as 4 moles of chlorine, while removal of a cyano group will require at least one mole of chlorine. In carrying out the invention there preferably is employed at least a 30 percent excess of chlorine (over and above the stoichiometric requirement), and in a more preferred practice of the invention there is employed at least a 100 percent excess of chlorine. A four to fifteen fold excess of chlorine can also be employed with good results. When employed in such amounts the excess chlorine serves a substantial diluent as well as a reactant function and thus makes it possible to omit the use of an inert gaseous diluent or to reduce the content thereof, if desired. The presence of excess chlorine tends to ensure good mixing of the reactants and thus assists in preventing decomposition of the heterocyclic nitrogen compound starting materials which might otherwise occur at reaction temperatures above about 350° C. However, even when employing large amounts of excess chlorine, an inert diluent such as vaporous carbon tetrachloride or the like is preferably employed so as to effect a better control over the reaction and to reduce any tendency toward the formation of tarry and other undesiable by-prdoucts. Accordingly, the invention will be so described hereinafter in its preferred embodiments.

The amount of inert diluent to be employed is not critical. Good results can be obtained by using from about 3 to at least 50 moles of this diluent per mole of the heterocyclic nitrogen starting compound, and such a range is preferred whether or not there is also employed a large excess of chlorine.

In carrying out the process of this invention the vaporous heterocyclic nitrogen compound and excess chlorine, together with any inert diluent gas employed, are introduced with rapid, turbulent mixing into a reaction zone maintained at temperatures falling within a range of from at least 350° C. to about 750° C. It is critical and essential to an efficient practice of the present invention that there be rapid and turbulent mixing of the reactants as they are brought up to reaction temperatures above about 350° C. and maintained thereat during the reaction time.

It is among the advantages of the present process that when the vaporous reactants and diluent gas or gases are mixed in the specified manner, an overall exothermic, homogeneous reaction rapidly ensues. However, due to the presence of the diluent gases it may be necessary to supply the reaction zone with external heat in order to maintain the temperature at the desired level. It is a further advantage that the reaction proceeds to good yields of desired products without the use of heterogeneous or actinic catalysis.

Preferred conditions for carrying out the reaction are determined by the product or products desired. Thus, desirable ratios of chlorine to the heterocyclic nitrogen starting compound and ratios of diluent to said compound, residence time and reaction temperature may depend on the reactant, i.e., whether piperidine, 2-methylpiperidine, decahydroquinoline or the like, and on the degree of chlorination of the starting materials. Chlorine, itself, may be a neutral substituent on a partially chlorinated heterocyclic nitrogen compound and such partially chlorinated compounds may be further chlorinated in the present process. This embodiment of the invention is of particular importance from the standpoint of enabling recycle of incompletely chlorinated products from the process when the same is operated as a continuous process. Further, it has been found that by operating under the more stringent temperature conditions, chlorinolysis of certain of the products may be accomplished. As an example, pentachloropyridine can be produced by chlorinolysis of an alkyl group from an alkylpiperidine or of a cyano group from a cyanopiperidine.

Within the broadly operable temperature range of from at least 350° C. to about 750° C. a preferred reaction zone temperature range for employment in the present invention is from about 450° C. to about 650° C. Within this preferred range the optimum temperature to employ for any given preparation will vary depending not only on the nature of the heterocyclic nitrogen starting compound but also on the particular chlorinated product or products desired. Thus, particularly good results are obtained with the various piperazine and N-substituted piperazines at temperatures of about 475° C. to 550° C., while with the corresponding piperidine and hydroquinoline compounds, resort is preferably had to somewhat higher temperatures in a 500° C. to 650° C. range. Further, when starting with a heterocyclic nitrogen compound which is substituted on one or more ring carbon atoms with a neutral substituent which is to be replaced by chlorine during the reaction, temperatures of at least 450° C. to 600° C. are preferred so as to effect the necessary chlorinolysis. Thus, chloroinolysis of methyl groups occurs above about 450° C. to 500° C. and of cyano groups above about 550° C. to 600° C. When operating with any particular heterocyclic nitrogen compound, one or a few range-finding determinations suffice for a proper determination of the optimum temperature for obtaining desirable yields of a particular product.

Although the exact residence time is not critical, the heated reactants should not be permitted to remain in contact for a prolonged period. The contact period or residence time depends on the temperature with the operable ranges of temperature for particular products. Thus, lowering the temperature ten dgrees may double the permissible residence time but will ultimately be limited by the operable range for obtaining a particular product. Residence time generally will not exceed 5 to 6 minutes. The preferred residence time or time for contact is from about 5 to 35 seconds at temperatures up to about 650° C. At higher temperatures residence times of only 1 to 2 seconds may suffice.

Operating pressures are not critical and may vary from subatmospheric to somewhat superatmospheric. Atmospheric pressure is satisfactory and is preferred.

In one manner of carrying out the reaction, the appropriate heterocyclic nitrogen compound, along with an inert diluent, is fed through an evaporator maintained at temperatures high enough to effect rapid vaporization of the feed, and preferably at temperatures of about 20° C. to 100° C. above the boiling point of the heterocyclic nitrogen compound or compounds employed. In this connection, temperatures falling in a range of from about 100° C. to somewhat below 350° C. will suffice for most preparations. Any vaporizing device may be employed as evaporator and either an inclined tube jacketed with heating coils or a wiped film evaporator is found to be convenient. For efficient operation it is necessary that the feed rate and/or temperature of the evaporator be maintained so as to completely vaporize the reactant heterocyclic nitrogen compound and maintain the compound in the vaporized state. It has been noted that incomplete vaporization results in decreased yield of the desired perchlorinated hetetrocyclic nitrogen compound.

The vapors from the evaporator are rapidly and turbulently mixed with chlorine in the presence of the diluent gas, said mixing preferably taking place just prior to the point of entry of the feed stream to the reactor. The resulting gaseous mixture is conducted at a rapid rate in a turbulent flow into the hot reactor maintained at a temperature of from at least 350° C. to about 750° C. where, in the vapor phase, a reaction takes place in this temperature range which is formative of the desired perchlorinated aromatic heterocyclic nitrogen compound together with hydrogen chloride and various other compounds as by-products. In one preferred embodiment the mixing of the reactants is accomplished in a nozzle from which the mixture is rapidly injected in turbulent flow into the reactor. Alternatively, the diluent containing vapors of the heterocyclic nitrogen compound and the chlorine may be simultaneously but separately introduced into the reactor. In this method the chlorine must be jetted in at a point close to the point of introduction of the heterocyclic nitrogen compound in such manner to ensure very rapid mixing and turbulent flow of the reactants if carbonization of the starting material is not to occur.

Whatever method of bringing the reactants together be employed, the turbulence should be such as to provide a Reynolds number of at least 800. The preferred Reynolds number is about 2000. Generally, an inlet vapor velocity of the feed into the heated reaction zone of from about 40 to 100 feet per second is considered desirable.

Any suitable reactor can be employed and, since the reaction is exothermic, strong heating is required only at the initiation of the reaction. Thereafter heat is applied only as required to maintain the reaction mixture at the desired temperature. Accordingly, the reactor should be provided with a heating coil or other heating means so as to bring the entrant feed gases rapidly up to reaction temperatures and to maintain seaid temperatures as the gaseous mixture passes through the reaction zone. The inlets, outlets and interior surfaces of the reactor must be of materials such as are known to resist corrosion by chlorine and hydrogen chloride at high temperatures. Thus, for example, such surfaces may be lined with nickel, carbon, silica or glass. In practice, it has been found that thermally resistant, high-silica glass such as Vycor brand is satisfactory for small reactors. In large scale apparatus it is convenient to employ a shell of nickel lined with fused silica or a suitable refractory such as carbon. To accomplish the essential rapid, turbulent mixing and introduction of the reactants into the reaction zone, the reactor may be fitted with a mixing nozzle, as described above, for introducing the reactants with substantially simultaneous mixing. Alternatively, the organic reactant plus diluent and the chlorine may be introduced into the reactor by separate but closely adjacent orifices adjusted so that the chlorine is jetted into the incoming stream of organic reactant plus diluent. In a further embodiment wherein the heterocyclic nitrogen compound, diluent and chlorine are introduced into the reactor with mixing immediately prior to such introduction, the mixing and introduction are carried out in a tube or the like of a diameter which is small in relation to the diameter of the reactor whereby turbulence at the entrance is achieved at relatively low Reynolds numbers in accordance with known principles. In a preferred form of apparatus the reactor proper is in the form of a cylinder having a length of 4 to 6 times its diameter. Conventional accessories, such as flowmeters on the inputs and condensors, cooling tubes or a quench tower for the exit gases, are employed.

The vapors passing from the reactor are cooled or quenched to separate (a) a liquid mixture comprising perchlorinated heterocyclic nitrogen products, inert diluent and unreacted or partially reacted heterocyclic nitrogen compounds from (b) a gaseous mixture comprising chlorine, hydrogen chloride and any other gaseous by-products. Depending on the product sought by the reaction, the liquid mixture can be fractionally distilled to recover the desired products either as a distillate or as a residue, or the liquid can be cooled to precipitate the product which is then removered by filtration. Materials not fully chlorinated can be recovered as such or recycled to the evaporator for further reaction. The gaseous mixture can be scrubbed according to conventional procedures to separate chlorine from the hydrogen chloride formed during the reaction. The former can be dried and recycled while the latter can be recovered as hydrochloric acid. The product, whether recovered by distillation or by precipitation and filtration, can be further purified, if desired, by methods well known to those skilled in the art.

In a preferred method for carrying out the process according to the present invention, a mixture of appropriate heterocyclic nitrogen compound and a perchlorohydrocarbon diluent is introduced into a heated evaporator where the reactant and diluent are vaporized, the resulting vapors are rapidly mixed with excess chlorine and introduced into a heated reactor column at high turbulence whereupon a reaction takes place in the temperature range of from at least 350° C. to about 750° C. to produce the desired perchloroheterocyclic nitrogen compound in the vaporous mixture, the mixture is conducted from the reactor, condensed, and the product recovered from the liquid condensate by conventional procedures known to those skilled in the art.

DESCRIPTION OF THE PREFERRED EMBODIMENTS

The following examples illustrate the invention but are not to be construed as limiting:

Example 1

In this operation 100 grams of a 10% by weight solution of piperidine (0.117 mole) in carbon tetrachloride were continuously metered under 5 p.s.i. nitrogen pressure from a feed reservoir through a heated reactor evaporator tube at a rate of 2.5 grams per minute. The temperature in the tube was such as to evaporate the feed stream and provide an exit temperature of 210° C. Chlorine gas was continuously metered into the hot exit gases from the evaporator at a rate of 4.65 grams per minute, the mole ratio of chlorine to piperidine being approximately 22:1. The stoichiometric chlorine requirement is 8 moles. The resulting gases were rapidly mixed and continuously jetted through a small orifice (0.25 cm. diameter) of a nozzle at a rate of 65 feet per second into one end of a heated "Vycor" glass reactor having a 1.35 liter capacity and a length to diameter ratio of 5:1. The nozzle was maintained at temperatures only slightly below those prevailing in the reaction zone. Under these conditions the gases passing through the nozzle and into the reactor are well mixed and in a highly turbulent condition which persists until the reaction mixture exits from the reactor. The reaction took place in the reactor at 580° C. to form pentachloropyridine together with hydrogen chloride and other chlorinated by-products. The residence time in the reactor was about 14 seconds. The gaseous reaction mixture was recovered and condensed in two consecutive cold traps cooled with a Dry Ice-dichloromethylene mixture. The cooled product was slowly warmed to room temperature and the excess chlorine and hydrogen chloride were caught in a trap containing an aqueous solution of sodium hydroxide. The remaining liquid was evaporated to dryness on a rotary evaporator under reduced pressure to yield 14.3 grams of a light brown solid. This product contained no tars it was completely vaporized when subjected to gas liquid chromatographic analysis which disclosed the presence of six components, the last one accounting for 65 mole percent of the eluent. Recrystallization from carbon tetrachloride isolated the product corresponding to the latter peak in about 98 mole percent purity. It was identified by infra red spectrum and melting point (125°–126° C.) as pentachloropyridine. The yield was estimated to be 32 percent.

Example 2

In a manner and with equipment similar to that described above in Example 1 the operation thereof was repeated using a chlorine to piperidine molar ratio of 27:1, a reaction temperature of 500° C. and a residence time in the reactor of 16 seconds.

From the 25 grams of piperidine feed to the reactor there was recovered 58.1 grams of a dried crude product which was found to contain 37.5% of pentachloropyridine. This corresponds to a yield of 30 percent.

Example 3

In a manner and with equipment similar to that previously described, a feed solution containing 10 grams (0.0718 mole) of decahydroquinoline in 90 grams of carbon tetrachloride was forced through the evaporator tube heated to provide a vapor exit temperature of 280° C. at a rate of 2 grams per minute. Chlorine gas was metered into the hot exit gases from the evaporator at a rate of 4.65 grams per minute, the molar ratio of chlorine to decahydroquinoline being 46:1. The stoichiometric chlorine requirement is 12 moles. The feed gas mixture was supplied to the reactor at a rate of 63 feet per second. The reactor temperature was maitnained at 600° C, throughout the run and the calculated reactor residence time was 14 seconds. On terminating the run and working up the product in the manner described in Example 1, there was recovered 20.1 grams of solid. Gas liquid chromatographic analysis showed a total of 8 components in the crude product, the last one constituting 84 mole percent of the eluent. The solid was free of tar constituents. This eighth component was recovered and identified by infra red spectrum and melting point (150°–152° C.) as heptachloroquinoline. The yield was 64%.

Example 4

In this operation, conducted in the same general fashion as set forth in Example 1 except as noted below, a solution of 7 grams (0.0813 mole) of anhydrous piperazine in 63 grams of chloroform was forced through the evaporator tube heated to provide an exit temperature of 190° C. at a rate of 1.05 grams per minute. Chlorine gas was metered into the hot exit gases from the evaporator at a rate of 6.05 grams per minute, the molar ratio of chlorine to piperazine being 51:1. The stoichiometric chlorine requirement is 7 moles. The mixed feed gases were supplied to the reactor at a rate of 67.2 feet per second. The reactor temperature was maintained at 505° C. throughout the run and the calculated reactor residence time was 20 seconds. The reaction product recovered in the cold traps on being freed of chlorine and hydrogen chloride was dissolved in excess methylene dichloride. The resulting solution was treated with activated charcoal, filtered and evaporated to dryness. The dry product so obtained was recrystallized from carbon tetrachloride, yielding 4.7 grams of a solid. Gas liquid chromatographic analysis showed the major component to be 98 mole percent of the solid. The infra red spectrum and the chromatographic analysis permitted identification of this component as tetrachloropyrazine. The yield was 26 percent. No tarry by-products were formed during the reaction.

Example 5

In this operation, conducted using the same equipment and procedure as described in Example 1, a feed solution of 25 grams of N-methylpiperazine in 225 grams of carbon tetrachloride was forced through the evaporator tube heated to provide an exit temperature of 200° C. at a rate of 2.1 grams per minute. Chlorine gas was metered into the hot exit gases from the evaporator at a rate of 4.6 grams per minute, the molar ratio of chlorine to N-methylpiperazine being 58:1. The stoichiometric chlorine requirement is 10 moles. The mixed feed gases were supplied to the reactor at a rate of 52.2 feet per second. The reactor temperature was maintained at 500° C. during the run, and the calculated reactor residence time was 17 seconds. At the end of the run the product was isolated by distilling off the more volatile components, leaving 16.6 grams of a semi-solid material. Gas liquid chromatography analysis indicated the presence of seven components, the last one of which accounted for 82 mole percent of the eluent. No tarry by-product was formed. Recrystallization of the crude product from hexane gave tetrachloropyrazine as determined by infra red spectrum and melting point (98° C.). The yield was 42 percent.

Example 6

The apparatus and general procedure of Example 1 were used. The feed solution consisted of 25 grams (0.219 mole) of N,N'-dimethylpiperazine in 225 grams of carbon tetrachloride. It was introduced into the evaporator tube heated to provide an exit temperature of 155° C. at a rate of 2.1 grams per minute. Chlorine gas was metered into the hot exit gases from the evaporator at a rate of 4.65 grams per minute, the molar ratio of chlorine to N,N'-dimethylpiperazine being 70:1. The stoichiometric chlorine requirement is 13 moles. The mixed feed gases were supplied to the reactor at a rate of 51.5 feet per second. The reactor temperature was maintained at 500° C. during the run, and the calculated residence time in the reactor was 18 seconds. At the end of the run the product was recovered by distilling off the more volatile components, leaving 18 grams of a dark semi-solid. Gas liquid chromatographic analysis showed the presence of twelve components, the major one (8th on the chromatogram) being 51 percent of the eluent. From the infra red spectrum and the chromatographic retention time the main component was identified as tetrachloropyrazine. The yield was 38 percent.

Example 7

Using the apparatus, and following the same general procedure as described in Example 1, a 10% solution of 2-methylpiperidine (15.75 grams; 0.158 mole) was forced through an evaporator tube heated to provide a vapor exit temperature of about 200° C. at a rate of 1.51 grams per minute. Chlorine gas was metered into the hot exit gases from the evaporator at a rate of 4.65 grams per minute, the molar ratio of chlorine to methylpiperidine being 44:1. The stoichiometric chlorine requirement is 11 moles for the production of pentachloropyridine. The mixed feed gases were supplied to the reactor at a rate of 53.8 feet per second for 105 minutes. The reactor temperature was maintained at about 500° C. throughout the run and the calculated reactor residence time was 17 seconds. The reaction product recovered in the cold traps was heated to distill off carbon tetrachloride and chlorine, after which it was charcoal filtered and evaporated to constant weight leaving 29.6 grams of a semi-solid crude product. Gas liquid chromatography analysis indicated the presence of four components, of which the third and fourth represented the major elements. From the infra red spectrum and the chromatographic retention time, the third component was identified as mixed tetrachloropyridines (34 percent yield) and the fourth component as pentachloropyridine (30 percent yield).

Example 8

Using the equipment, and in a manner generally similar to that described in Example 1, liquid piperidine is fed through an evaporator in the absence of any inert diluent component at a rate of 0.25 gram per minute. The piperidine vapors existing from the evaporator at a temperature of 200° C. are mixed in a nozzle with hot (200° C.) chlorine gas supplied at a rate of 10 grams per minute. The mole ratio of chlorine to piperidine is approximately 48:1, representing a five-fold excess over the stoichiometric requirement of 8 moles. The mixed chlorinepiperidine gases are rapidly and continuously jetted through the small orifice of the nozzle into the reactor at a rate of about 100 feet per second. The reactor temperature is 500° C. and the residence time of the reactant vapors therein is calculated to be about 9 seconds. On terminating the run and working up the product in the manner described in Example 1 there is recovered a product from which pentachloropyridine is recovered in good yield.

The products of the present invention have numerous uses. Many of the perchlorinated aromatic heterocyclic nitrogen compounds are useful as intermediates for the preparation of other chlorinated heterocyclic nitrogen compounds, for example, chloropyridyl sulfones useful as paint preservatives and for other fungicidal applications. This reaction is effected by reacting pentachloropyridine with sodium methylmercaptide to form 2,3,5,6-tetrachloro-4-methylthiopyridine which is then oxidized to the corresponding sulfone.

Certain of the products obtained by the process of the present invention are useful as pesticides, they being used, for example, in the control of undesirable plants and weed seeds. In representative operations, aqueous compositions containing pentachloropyridine give good control of vegetation such as wild oats when applied at a dosage level of 50 pounds per acre to soil planted therewith.

Heptachloroquinoline has herbicidal and nematocidal properties. Tetrachloropyrazine has excellent fungicidal activity and may be employed as a broad spectrum soil fungicide. It gives complete control of soil-dwelling fungi when the organisms are exposed to growth media containing said compound at a concentration of 100 parts per million parts by weight of the growth medium.

The perchloroquinolines may be converted to their N-oxides which are useful as fruit fly repellants. Perchloroquinoxaline and 3-cyano-perchloroquinoline have been found to be useful as fungicides.

We claim:

1. A process for the production of perchlorinated aromatic compounds having a total of from 6 through 10 carbon and nitrogen atoms as the sole ring-forming atoms, which comprises reacting chlorine with vapors of a heterocyclic nitrogen compound having a total of from 6 through 10 nitrogen and carbon atoms as its sole ring-forming atoms, and which is at least partially saturated, in the presence of a diluent gas at temperatures in a range of from at least 350° C. to about 750° C. under conditions of turbulent flow, said chlorine being present in excess over the stoichiometrically required amount.

2. A process for the production of perchlorinated aromatic compounds having a total of from 6 through 10 carbon and nitrogen atoms as the sole ring-forming atoms, which comprises introducing vapors of a heterocyclic nitrogen compound having a total of from 6 through 10 nitrogen and carbon atoms as its sole ring-forming atoms, and which is at least partially saturated, an inert diluent gas and chlorine into a reaction zone with rapid, turbulent mixing, said reaction zone being maintained at a temperature in a range of from at least 350° C. to about 750° C. and said chlorine being present in excess over the stoichiometrically required amount.

3. A process in accordance with claim 2 wherein the diluent gas is a vaporized perchlorinated hydrocarbon.

4. A process in accordance with claim 2 wherein the diluent gas is vaporized carbon tetrachloride, tetrachloroethylene or hexachlorobutadiene.

5. A process in accordance with claim 2 wherein the heterocyclic nitrogen compound is piperidine.

6. A process in accordance with claim 2 wherein the heterocyclic nitrogen compound is piperazine.

7. A process in accordance with claim 2 wherein the heterocyclic nitrogen compound is N-methylpiperazine.

8. A process in accordance with claim 2 wherein the heterocyclic nitrogen compound is N,N'-dimethylpiperazine.

9. A process in accordance with claim 2 wherein the heterocyclic nitrogen compound is decahydroquinoline.

10. A process in accordance with claim 2 wherein the heterocyclic nitrogen compound is piperidine, piperazine, N-methylpiperazine, N,N' - dimethylpiperazine or decahydroquinoline and the diluent is carbon tetrachloride.

11. A process for the production of pentachloropyridine which comprises introducing vaporized piperidine in an inert diluent vapor, together with chlorine, into a reaction zone with rapid, turbulent mixing, said reaction zone being maintained at a temperature of from about 450° C. to about 650° C., and said chlorine being present in an excess of at least 30 percent over the amount theoretically required to effect aromatization and perchlorination of said piperidine.

12. A process for the production of tetrachloropyrazine which comprises introducing vaporized piperazine in an inert diluent vapor, together with chlorine, into a reaction zone with rapid, turbulent mixing, said reaction zone being maintained at a temperature of from about 450° C. to about 650° C., and said chlorine being present in an excess of at least 30 percent over the amount theoretically required to effect aromatization and perchlorination of said piperazine.

References Cited

UNITED STATES PATENTS

| 2,945,858 | 7/1960 | Tarailo | 260—250 |
| 3,426,035 | 2/1969 | Bremmer | 260—289 |

NICHOLAS S. RIZZO, Primary Examiner

U.S. Cl. X.R.

260—251, 290, 283